United States Patent [19]

Hakaridani et al.

[11] Patent Number: 5,633,991
[45] Date of Patent: May 27, 1997

[54] METHOD AND DEVICE FOR GENERATING A CHARACTER LINE OF UNIFORM WIDTH THROUGH CHARACTER SIZE CONVERSION

[75] Inventors: Mitsuhiro Hakaridani, Ikoma; Yutaka Shigi, Yamatokooriyama; Masako Nakanishi, Yoshino-gun; Minehiro Konya, Daito; Masayuki Fujisawa; Hiroki Takaha, both of Yamatokooriyama, all of Japan

[73] Assignee: Sharp Kabushiki Kaisha, Osaka, Japan

[21] Appl. No.: 291,824

[22] Filed: Aug. 17, 1994

[30] Foreign Application Priority Data

Aug. 30, 1993 [JP] Japan ................................. 5-213659
May 13, 1994 [JP] Japan ................................. 6-099847

[51] Int. Cl.$^6$ ..................................................... G06K 9/36
[52] U.S. Cl. ............................................... 395/110; 395/170
[58] Field of Search .................................. 395/110, 109, 395/107, 112, 114, 115, 116, 117, 150

[56] References Cited

U.S. PATENT DOCUMENTS

| | | | |
|---|---|---|---|
| 5,016,001 | 5/1991 | Minagawa et al. | 340/747 |
| 5,081,594 | 1/1992 | Horsley | 395/150 |
| 5,097,518 | 3/1992 | Scott et al. | 382/47 |
| 5,113,252 | 5/1992 | Horie et al. | 358/77 |
| 5,113,455 | 5/1992 | Scott | 382/47 |
| 5,155,805 | 10/1992 | Kaasila | 395/151 |
| 5,159,668 | 10/1992 | Kaasila | 395/151 |
| 5,255,351 | 10/1993 | Takanashi et al. | 395/109 |
| 5,301,267 | 4/1994 | Hassett et al. | 395/150 |
| 5,325,479 | 6/1994 | Kaasila | 395/151 |

FOREIGN PATENT DOCUMENTS

1303489  12/1989  Japan .

*Primary Examiner*—Raymond J. Bayerl
*Assistant Examiner*—Steve Sax

[57] ABSTRACT

A method and device for generating a character line of uniform width throughout character size conversion includes predetermining an offset value corresponding to a target line width; adjusting a line width of each character part to the target value without consideration of respective line widths; obtaining coordinate data by reading coordinates of a dot sequence of each character part; reading an offset value corresponding to a character size after coordinate transformation on the basis of the read-out coordinate data. A reference point for a character part from the coordinate data is selected and coordinates of the dot sequence of the character part are transformed to a specified size. A character part font is generated using the transformed dot sequence and superimposing a character part font onto another character part for plotting a character.

10 Claims, 10 Drawing Sheets

| C 1 | C 2 | C 3 | C 4 |
|---|---|---|---|
| P 1( 20,200) | P 5(120,245) | P 9(235,200) | P13( 20, 35) |
| P 2( 34,200) | P 6(136,245) | P10(248,200) | P14(248, 35) |
| P 3( 34, 25) | P 7(136, 25) | P11(248, 25) | P15(248, 20) |
| P 4( 20, 25) | P 8(120, 25) | P12(235, 25) | P16( 20, 20) |

FIG.7

| CHANGED SIZE | OFFSET VALUES | | | | | | |
|---|---|---|---|---|---|---|---|
| | 0 | 1 | 2 | 3 | 4 | 5 | 6 |
| 32 | 3 | 3 | 3 | 3 | | | |
| 34 | 3 | 3 | 3 | | | | 3 |
| 36 | 3 | 3 | | | | 3 | 3 |
| 38 | 3 | | | | 3 | 3 | 3 |
| 40 | | | | 4 | 3 | 3 | 3 |
| 42 | | | | 4 | 3 | 3 | |
| 44 | | | 4 | 3 | 3 | | |
| 46 | | 4 | 4 | 3 | | | |
| 48 | | 4 | 4 | | | | 4 |
| 50 | 4 | 4 | | | | 4 | 4 |
| 52 | 4 | 4 | | | | 4 | 4 |
| 54 | 4 | | | | 4 | 4 | |
| 56 | | | | 4 | 4 | | |
| 58 | | | | 4 | | | |
| 60 | | | 5 | 4 | | | |
| 62 | | | 5 | | | | 5 |
| 64 | | 5 | | | | 5 | |

(EACH VACANT COLUMN MEANS THAT LINE WIDTH IS UNSTABLE.)

FIG.8

| TURNING POINT NO. | PRIOR ART (1) | PRIOR ART (2) | COORDINATE TRANSFORMATION AND OFFSET VALUES ACCORDING TO THE PRESENT INVENTION | | | |
|---|---|---|---|---|---|---|
| | | | 0 | 2 | 3 | |
| P1 | 3, 34 | 3, 34 | 3, 34 | 3, 34 | 4, 35 | |
| P2 | 6, 34 | 5, 34 | 5, 34 | 6, 34 | 6, 35 | |
| P3 | 6, 4 | 5, 4 | 5, 4 | 6, 4 | 6, 5 | |
| P4 | 3, 4 | 3, 4 | 3, 4 | 3, 4 | 4, 5 | |
| P5 | 21, 42 | 21, 42 | 21, 42 | 21, 42 | 22, 42 | |
| P6 | 23, 42 | 24, 42 | 24, 42 | 24, 42 | 24, 42 | |
| P7 | 23, 4 | 24, 4 | 24, 4 | 24, 4 | 24, 5 | |
| P8 | 21, 4 | 21, 4 | 21, 4 | 21, 4 | 22, 5 | |
| P9 | 40, 34 | 40, 34 | 40, 34 | 40, 34 | 41, 35 | |
| P10 | 43, 34 | 42, 34 | 42, 34 | 43, 34 | 43, 35 | |
| P11 | 43, 4 | 42, 4 | 42, 4 | 43, 4 | 43, 5 | |
| P12 | 40, 4 | 40, 4 | 40, 4 | 40, 4 | 41, 5 | |
| P13 | 3, 6 | 3, 6 | 3, 6 | 3, 6 | 4, 6 | |
| P14 | 43, 6 | 43, 6 | 42, 6 | 43, 6 | 43, 6 | |
| P15 | 43, 3 | 43, 3 | 42, 3 | 43, 3 | 43, 4 | |
| P16 | 3, 3 | 3, 3 | 3, 3 | 3, 3 | 4, 4 | |

METHOD AND DEVICE FOR GENERATING A CHARACTER LINE OF UNIFORM WIDTH THROUGH CHARACTER SIZE CONVERSION

BACKGROUND OF THE INVENTION

The present invention relates to a method and a device for generating a character line of a uniform width through the process of character size conversion and, more particularly, to a uniform line generating method and device for generating high quality characters each having uniform in width vertical and horizontal lines through the process of reducing a size of an outline font composed of turning points.

Such a character-size reducing method has been proposed that a character is disassembled into a plurality of character parts, a sequence of turning points (with coordinates) composing one character part is multiplied by a reduction ratio and a resultant value is round off to an integer. This method, however, can not obtain high-quality characters because of lacking in consideration of line width of transformed characters. Each character of uniform line before its size conversion may have uneven line after conversion.

Japanese laid-open patent No. 1-303489 describes such a proposal that a character is converted in size under the condition that paired line-segments for determining a line width of a character is classified into a reference line-segment and a line-segment to be corrected and a space from a corresponding reference line-segment is taken as a reference width, and then coordinates of correctable line-segment after the character size conversion are determined by coordinates of the reference line-segment and a rounded value of the reference width after the character size conversion.

Since this method determines a reference line width of the converted character from a reference line width of the character before its size conversion, it may be supposed that when a line segment having a slightly different width is converted into a segment of a reduced size, the converted line may be of an uneven width due to a rounding error of the reference line width.

When a dot sequence of a line having a slight unevenness in its width is converted to be reduced in size, the unevenness of the line width may be produced mainly from a round-off error caused when coordinates of the converted dot sequence is rounded off to an integer.

When line widths of vertical and horizontal strokes contained in a character part are to be controlled, a reference line-segment for each directional stroke needs to be preset and a line width needs to be determined. Since the coordinate values of the reference line segments separately set for respective character parts are different from each other, the relative locations of the parts can not be maintained in the process of reducing the character size, resulting in sticking-out or separating of one character from another.

SUMMARY OF THE INVENTION

An object of the present invention is to provide a method and a device for generating a character line of a uniform width, which is capable of converting character parts having lines of slightly different widths, irrespective of their locations, into corresponding character parts that are reduced in size and have uniform line width with no sticking-out or separating element.

Another object of the present invention is to convert not only a character part having a line of the same width, but also a character part having lines of different widths within a certain range into respective character parts that are reduced in size and have a line of uniform width by conducting coordinate transformation of each character part by using a reference point, relative coordinates of dot sequences plus a predetermined offset value and a specified reduction ratio, making it possible to control rounding of the transformed coordinates of each dot sequence of reduced size according to the offset value.

Another object of the present invention is to control line width of vertical and horizontal strokes contained in a character part with only one reference point through the processing for reducing a character size by previously determining the abscissa of the reference point for control of line width of the vertical stroke and the ordinate of the reference point for control of a line width of the horizontal stroke.

Another object of the present invention is to convert a character into a reduced-in-size character, keeping relative arrangement of its parts and preventing sticking-out or separating element, by previously making even coordinates of reference points of such character parts which may stick out or separate from each other.

Another object of the present invention is to provide a method for setting a reference point which is capable generating a character part having a line of uniform width from a character part having lines of different widths within a specified range, irrespective of location of the character part to be transformed. This may be accomplished through coordinate-transformation for reducing the size of an outline font defined by dot sequences composing a character outline by representing coordinates of dot sequences before transformation as coordinates relative to an optional reference point and by transforming coordinates of the reference point and relative coordinates of the dot sequence plus a predetermined offset value by the use of a reduction ratio.

Another object of the present invention is to provide a method for setting a reference point for each character part, which determines coordinates of the reference point according to coordinates of components of vertical stroke and horizontal stroke of a character part and setting it for said character part. A line width of both vertical stroke and horizontal stroke of the character part can be effectively controlled through coordinate-transformation for reducing a size of the character.

Another object of the present invention is to provide a method for setting a reference point for each character part, which determines coordinates of the reference point of an optional part of the character according to coordinates of a reference point of another part of the character to control a relative arrangement of character parts through the processing for reducing a size of the character.

Another object of the present invention is to provide a device for generating a line of a uniform width, which comprises a data input portion for reading coordinates of a dot sequence and obtaining coordinate data, an offset value reading portion for reading an offset value corresponding to a reduced size of the character size on the basis of the coordinate data read by the data input portion, a reference point selecting portion for selecting a reference point for a character part from the coordinate data read by the data input portion, a coordinate transforming portion for transforming coordinates of a dot sequence of the character part to be reduced to a specified size, a plotting portion for generating a character part font by using a dot sequence transformed by the coordinate transforming portion and by plotting with superimposing the character part font onto another character part.

DESCRIPTION OF THE PREFERRED EMBODIMENTS

Figure 1A:
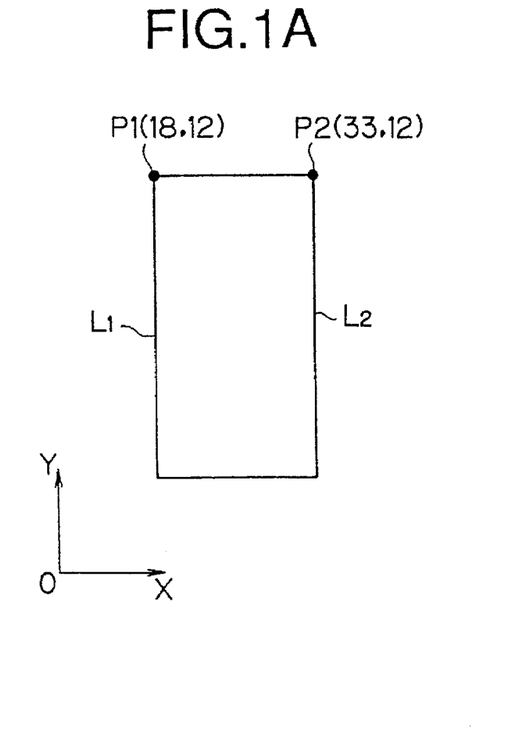
FIGS. 1A and 1B are views for showing coordinates of character turning points after coordinate conversion by a conventional method for reducing a character size.
Figure 1B:
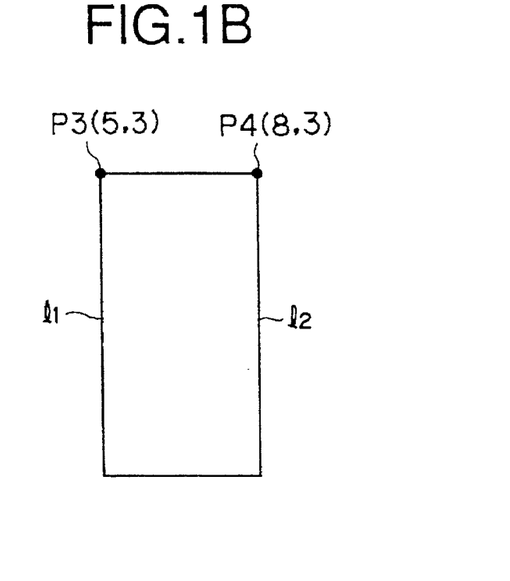

FIGS. 1A and 1B are views for explaining an example of a conventional character-size reduction method (prior art (1)). FIG. 1A shows a character part and its dot sequence (P1, P2) before size-reduction, and FIG. 1B shows a character part and its dot sequence after size-reduction. In the shown case, the character part of FIG. 1A is converted to be reduced in size by ¼. The size-reducing coordinate-transformation method is to multiply coordinates of each dot sequence by a reduction ratio and round the results to an integer by counting fractions of 5 and over as a unit and disregarding the rest. The abscissa 18 of a left line $L_1$ of the character part of FIG. 1A is converted into the abscissa 5 of a left line $l_1$, of the reduced-in-size character part of FIG. 1B. The abscissa 33 of a right line $L_2$ of the character part of FIG. 1A is converted into the abscissa 8 of a right line $l_2$ of the reduced in size character part of FIG. 1B.

Figure 2A:
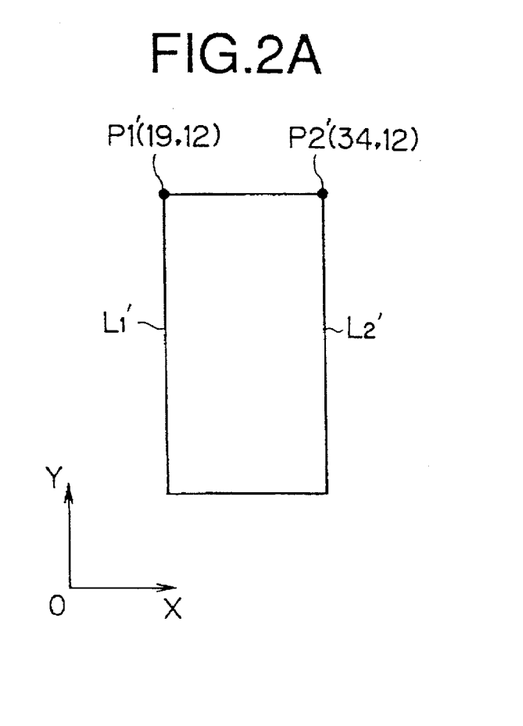
FIGS. 2A and 2B are views showing another coordinates in case of conducting the similar coordinate transformation to that shown in FIG. 1A and 1B.
Figure 2B:
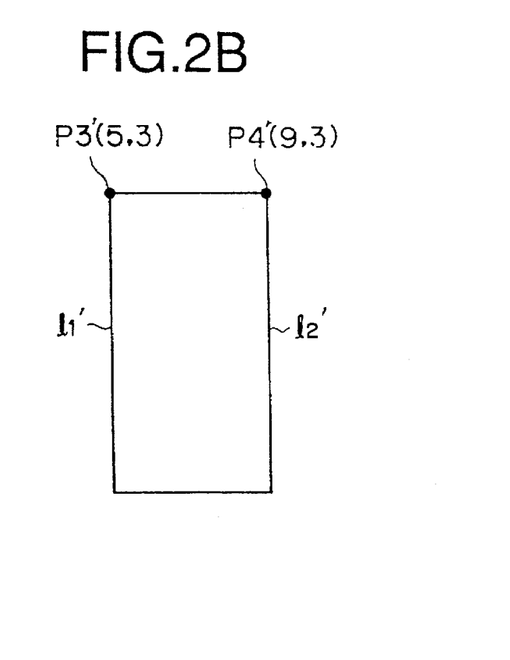

FIG. 2A shows coordinates of the character part of FIG. 1A translated by 1 in the direction of X-axis. FIG. 2B show coordinates of the character part of FIG. 2A reduced to ¼ in size. In this case, the abscissa 19 of a left line $L_1'$ of the character part of FIG. 2A is converted into the abscissa 5 of a left line $l_1'$ of the reduced-in-size character part of FIG. 2B. The abscissa 34 of a right line $L_2'$ of the character part of FIG. 2A is converted into the abscissa 9 of a right line $l_2'$ of the reduced in size character part of FIG. 2B.

The line-width values of the original (not reduced) character parts of FIGS. 1A and 2A are both equal to 16, but the line-width values of the converted character parts of FIGS. 1B and 2B are 4 and 5 respectively. As shown in FIG. 1B and FIG. 2B, the original characters of the same line width may differ from each other by their line width values after being reduced in size. In practical font data, a plurality of vertical and horizontal lines, which must be the same in width, may slightly differ from each other. Therefore, this method is hard to make uniform the line width of the character parts after size-reducing conversion.

Figure 3A:
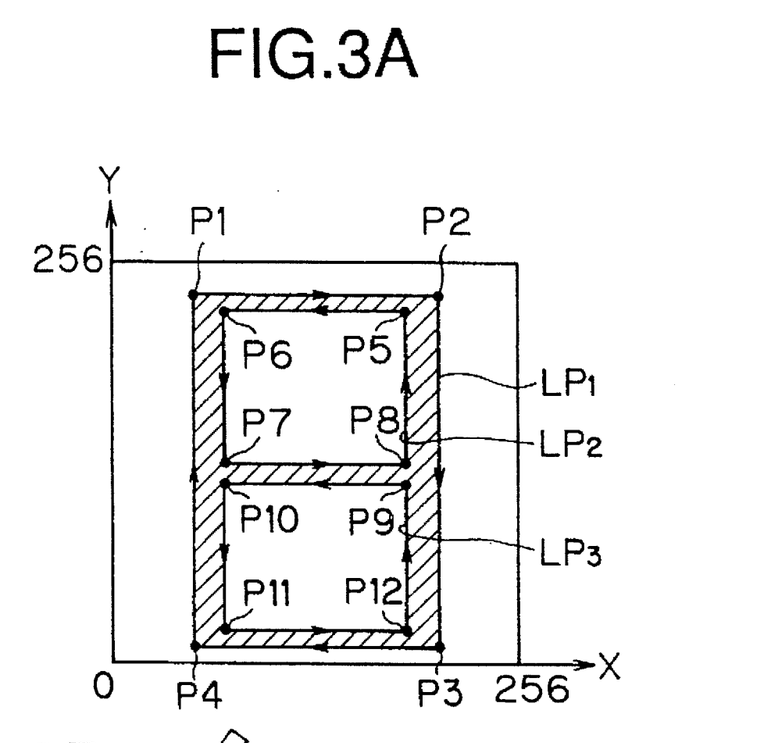
FIGS. 3A to 3C are views for explaining another conventional method for reducing a character size.
Figure 3B:
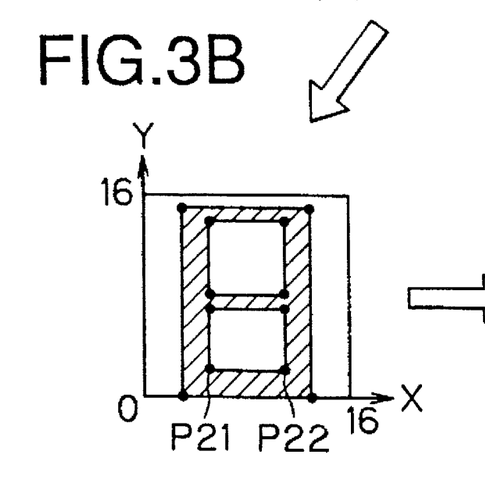

FIGS. 3A and 3B are views for explaining an example of a character outputting method (prior art (2)) disclosed in the Japanese laid-open patent No. 1-303489). In FIG. 3A, there is shown a Japanese character "日" having outline information described in a coordinate system of 256×256. In the shown case, the outline of the character is composed of three loops $LP_1$, $LP_2$ and $LP_3$, each of which is further composed of directional line segments. In this case, the line segments are directed to always have the hatched area at its right side. For example, the loop $LP_1$ is composed of four line-segments $P_1$-$P_2$, $P_2$-$P_3$, $P_3$-$P_4$, $P_4$-$P_1$, each being defined by coordinates $P_1$, $P_2$, $P_3$, $P_4$ in said order respectively.

A case of converting the character of 256×256 in size shown in FIG. 3A into a character of 16×16 in size is described as follows:

First, an index code of the character is entered into a microcomputer through a key board (not shown) to read out outline data (font data) of the character ("日" in the shown case) from a memory, then line segments being parallel to the X-axis are selected and are sorted according to the ordinate values, i.e., in order of $P_1$-$P_2$, $P_5$-$P_6$, $P_7$-$P_8$, $P_9$-$P_{10}$, $P_{11}$-$P_{12}$ and $P_3$-$P_4$.

Thus selected line segments according to their direction are classified into correctable line segments to be corrected for their ordinate values and reference line segments not to be corrected for their ordinate values. For instance, among paired line segments, those which are directed negatively toward the Y-axis (i.e., $P_5$-$P_6$, $P_9$-$P_{10}$, $P_3$-$P_4$) is taken as reference line segments, and others directed positively away from the Y-axis (i.e., $P_1$-$P_2$, $P_7$-$P_8$, $P_{11}$-$P_{12}$) are taken as correctable line segments to be corrected for their ordinate values. Each correctable line segment is opposite to its reference segment across a hatched area. The reference line segment has smaller but nearest ordinate value. In the shown case, correctable line segments $P_1$-$P_2$, $P_7$-$P_8$ and $P_{11}$-$P_{12}$ correspond to reference line segments $P_5$-$P_6$, $P_9$-$P_{10}$ and $P_3$-$P_4$ respectively. A difference of the ordinate values of the paired (reference and correctable) line segments is a reference width of a line. Similarly, the line segments being parallel to the Y-axis are subjected to the same processing as the line segments being parallel to the X-axis.

The coordinate points $P_1$, $P_2$ . . . $P_{12}$ constituting the character are linearly transformed to obtain a target character size. The values of the transformed coordinates are rounded to a dot unit (e.g., rounded off decimals). However, coordinates of each correctable line segment are determined by a rounded value of the reference width from the reference line segment.

Figure 3C:
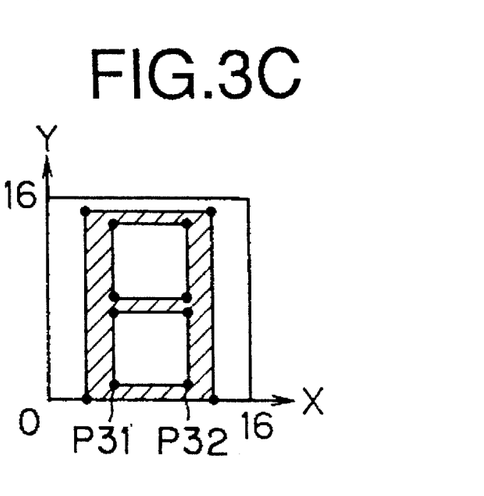

FIG. 3B shows a result of reduction of the character of FIG. 3A to a size of 16/256 without any correction. FIG. 3C shows a result of reduction of the same character with correction. As apparent from FIGS. 3B and 3C, the line segment $P_{21}$-$P_{22}$ of FIG. 3B is corrected into the line segment $P_{31}$-$P_{32}$ of FIG. 3C to obtain the same line width of the line segments parallel to the X-axis.

In the shown case, to regulate the line width of both vertical and horizontal strokes contained in one character part, reference line segments in respective directions need to set and the line width of respective line segments needs to be determined. Since the reference line-segments for respective character parts have different coordinate values, the relative positions of the character parts can not be maintained through the process of coordinate-transformation for size reduction and may cause one character part to stick out or separate away from the other character part.

In view of the foregoing, the present invention was made to provide a method and a device for generating a line of uniform width, which is capable of converting character parts of slightly different line widths into those which, irrespective of their coordinates, have vertical and horizontal line segments of a uniform line width without sticking-out or separating of one character part from the other.

Figure 4:
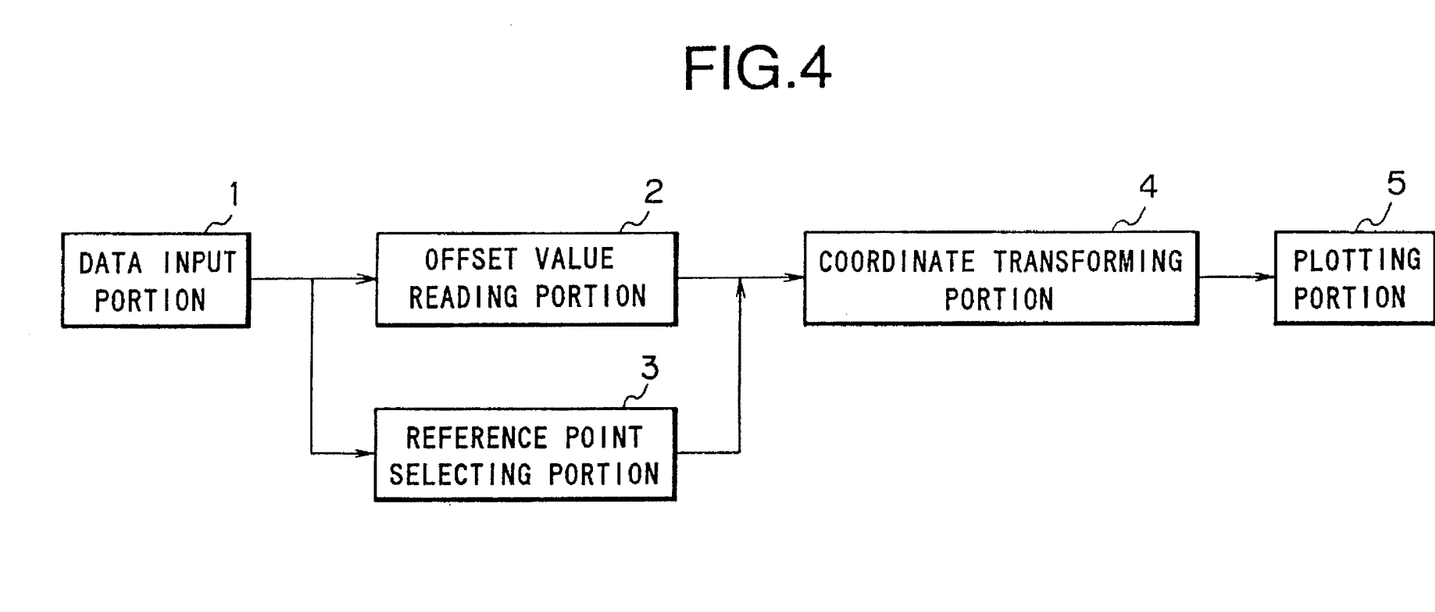
FIG. 4 is a circuit diagram for explaining an embodiment of a uniform line generator according to the present invention.

FIG. 4 is a circuit diagram for explaining an example of a device for generating a line of uniform width by using a reference point. In FIG. 4, 1 is a data input portion, 2 is an offset-value reading portion, 3 is a reference-point selecting portion, 4 is a coordinate transforming portion and 5 is a plotting portion.

The data input portion 1 reads coordinates of a dot sequence and obtains coordinate data. The offset-value reading portion 2 reads an offset value corresponding to a reduced size of the character after coordinate transformation according to the coordinate data from the data input portion. The reference-point selecting portion 3 selects a reference point for a character part from the coordinate data read by the data input portion 1. The coordinate transforming portion 4 transforms coordinates of the dot sequence of the character part for reducing the character part size. The plotting portion generates a character part font by using the dot sequence transformed by the coordinate transforming portion 4 and plots according to the character part font superimposed on the other character part.

Figure 5:
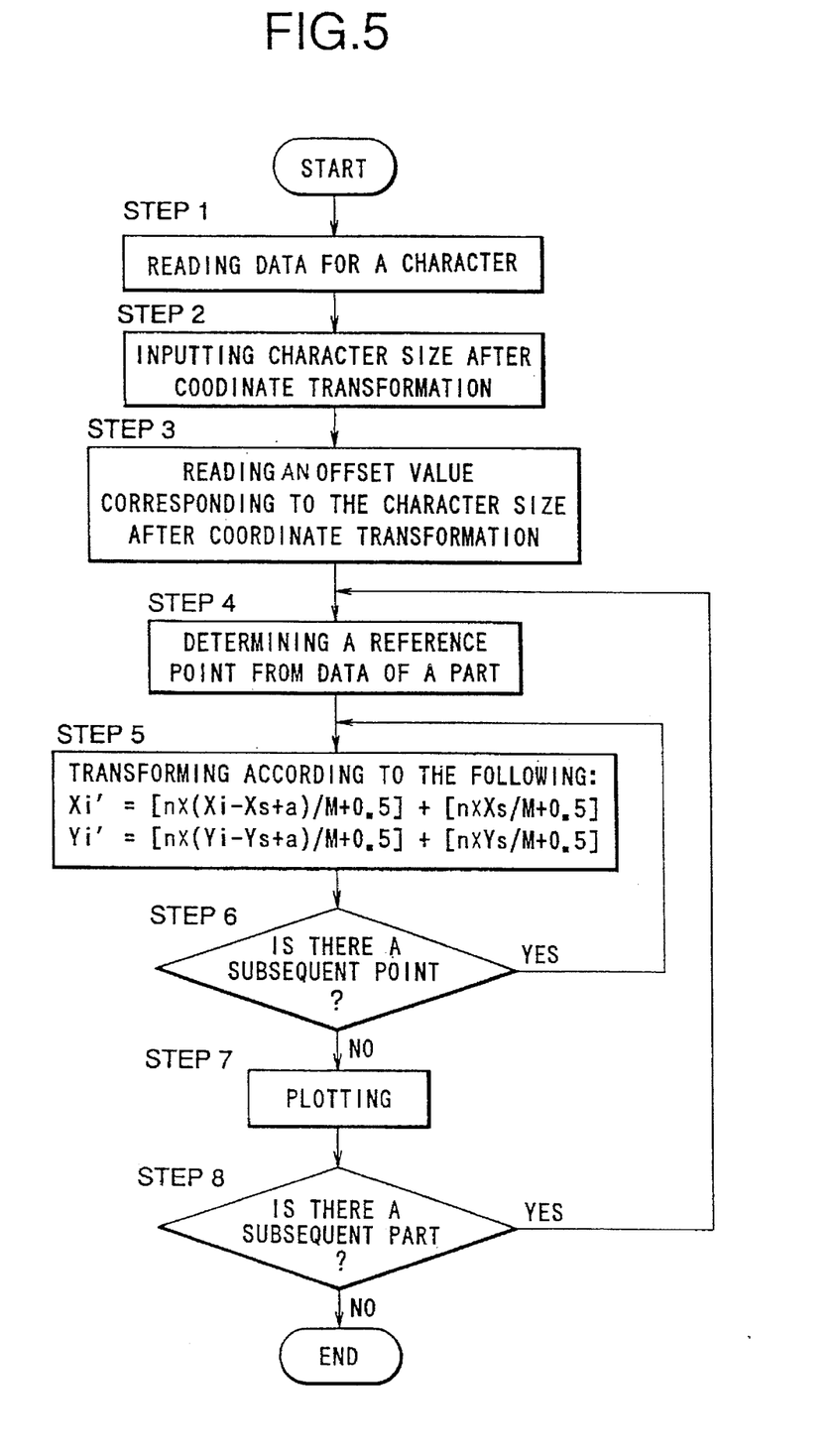
FIG. 5 is a flow chart for explaining a uniform line generating method according to the present invention.

FIG. 5 is a flow chart for explaining the operation of the uniform line generating device according to the present invention. In this case, a character outline font of 44×44 in size will be generated from an outline font of 256×256 in size.

Figure 6A:
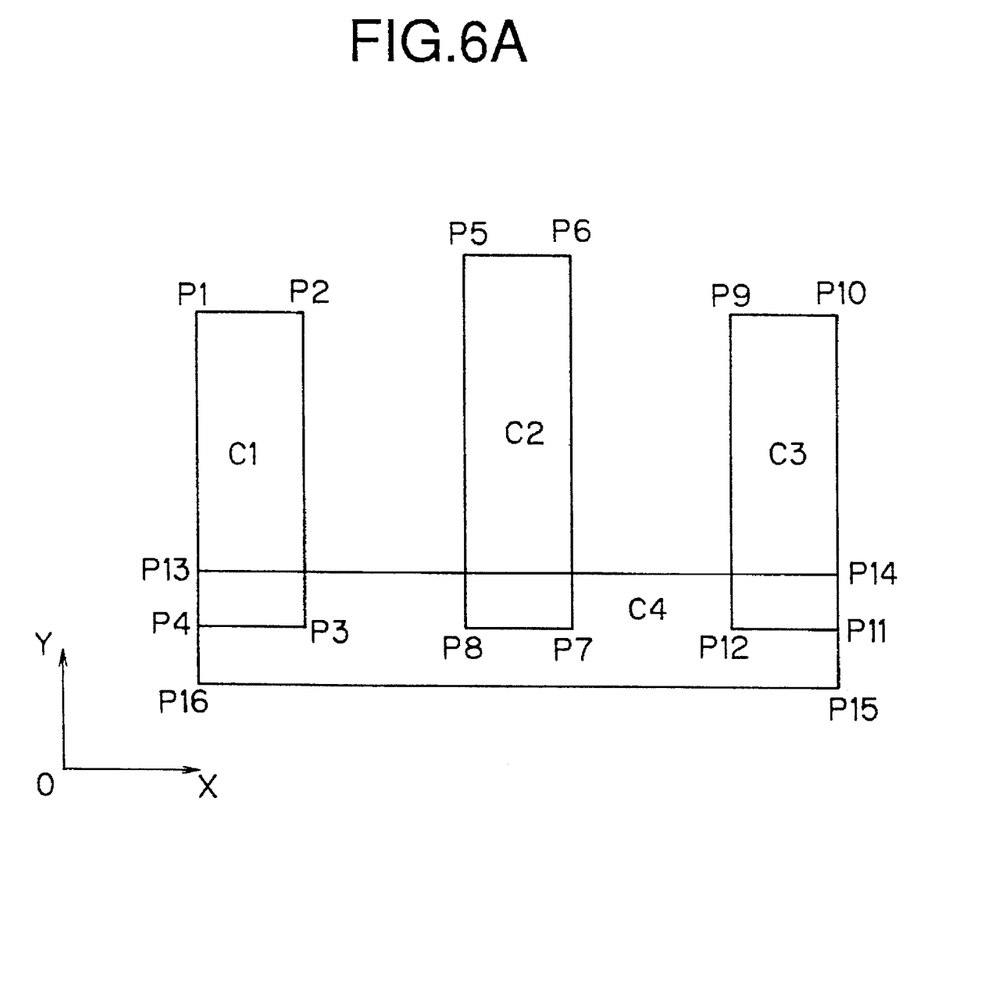
FIGS. 6A and 6B are character parts of 256×256 in size and coordinates of their outline font according to the present invention.
Figure 6B:
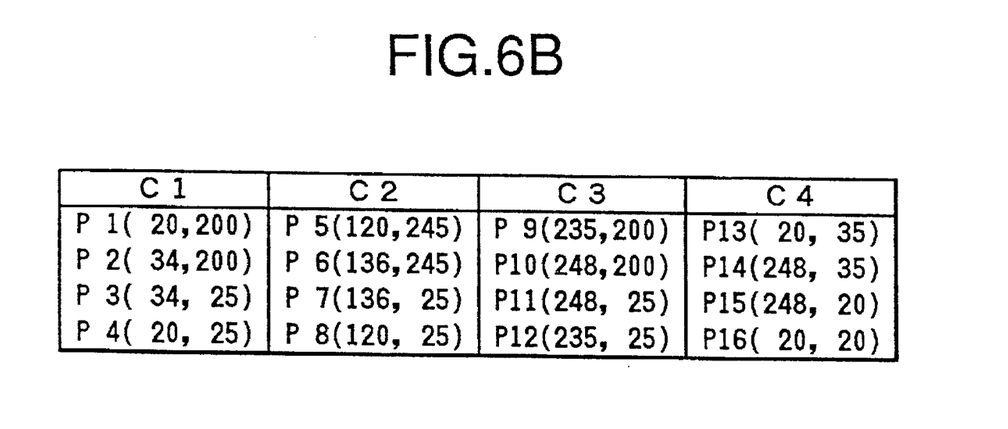

FIG. 6A shows an outline font of a Japanese character "山" of 255×255 in size and its dot sequences ($P_1$-$P_{16}$), and FIG. 6B shows coordinates of these dot sequences. This character is composed of a combination of four character-parts $C_1$-$C_4$ each consisting of four dot sequences ($P_1$-$P_4$, $P_5$-$P_8$, $P_9$-$P_{12}$, $P_{13}$-$P_{16}$).

The operation of the device is as follows:

Step 1: When processing starts, the data input portion 1 reads-in coordinates of dot sequences constituting an outline of one character as shown in FIG. 6B.

Step 2: Operator inputs a size (e.g., 44×44) of character to be generated by coordinate transformation for size reduction into the data input portion 1 through a key board.

Step 3: The offset-value reading portion 2 reads an offset value corresponding to a reduced size of the character after coordinate transformation. This offset value is predetermined according to character sizes before and after transformation, a range of line widths of a character before transformation, line width of character after transformation and a reference point. For instance, if a reference point is set at a point nearest to the origin O with coordinates (Xs, Ys) and an offset value is expressed as "a" for generating font data of n×n in size from a font data of M×M in size, coordinates (Xi', Yi') after transformation of coordinates (Xi, Yi) can be defined as follows:

$$Xi'=[n\times(Xi-Xs+a)/M+0.5]+[n\times Xs/M+0.5] \quad (1)$$

$$Yi'=[n\times(Yi-Ys+a)/M+0.5]+[n\times Ys/M+0.5] \quad (2)$$

where [ ] indicates Gauss' symbol ([α]—a maximal integer not exceeding α).

Figure 7:
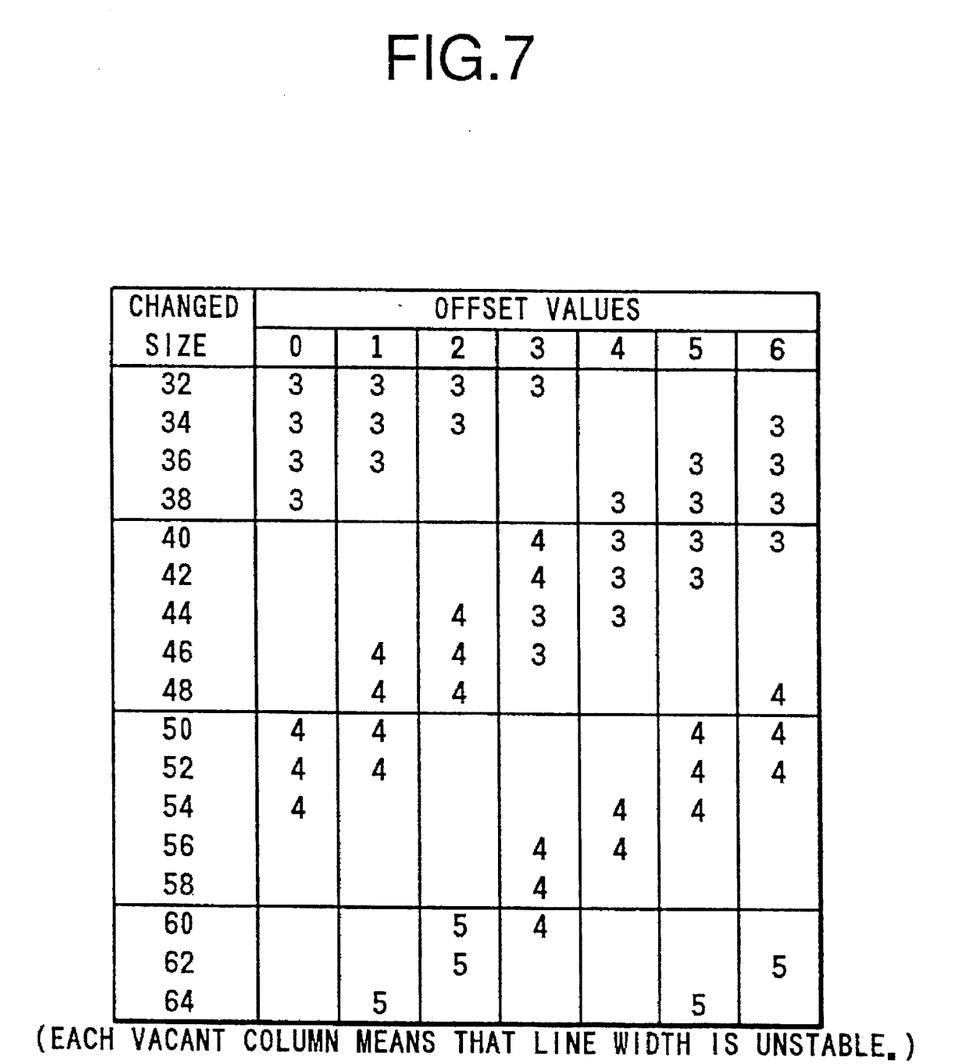
FIG. 7 shows results of converting coordinate data when reducing the character size by a conventional method and a method according to the present invention.

Referring to FIG. 7, there is shown a table indicating line-width values of vertical and horizontal lines of characters of a reduced size in a range of 32×32 to 64×64, which are generated by coordinate transformation of a 256×256-sized character including vertical and horizontal lines of 14 to 17 in width according to the equations (1) and (2).

From the table of FIG. 7, it is apparent that in case of converting the character into a 44×44-sized character, its converted line width is 4 at an offset value of 2 and is 3 at an offset value of 3 or 4. Accordingly, an offset value corresponding to a line width of a character to be generated is preliminarily selected from the data and stored in a memory.

Step 4: The reference-point selecting portion 3 selects a reference point for a character part among the data read-in by the data input portion. In this embodiment, a point of a character part, which is located nearest to the origin O of the coordinate system of FIG. 6A, is selected as a reference point thereof. Accordingly, a reference point $P_4$ is selected for a character part $C_1$ composed of the dot sequences of $P_1$ to $P_4$. Similarly, reference points $P_8$, $P_{12}$ and $P_{16}$ are set for character parts $C_2$, $C_3$ and $C_4$ respectively.

Step 5: The coordinate transforming portion 4 performs coordinate transformation of the dot sequences of each character part for reducing the size of a character. For this purpose, the transformation equations (1) and (2), which were used for obtaining offset values, are also applied.

Step 6: Checking is made for any dot-sequence remaining not transformed in the character part.

Step 7: The plotting portion 5 generates a character part font by using the dot sequences transformed at step 6 and performs plotting using the font overlaid on the other character part.

Step 8: Checking is made for any character part remaining not transformed. If a subsequent part remains, operation returns to step 4. If nothing remains, the processing is ended.

Figure 8:
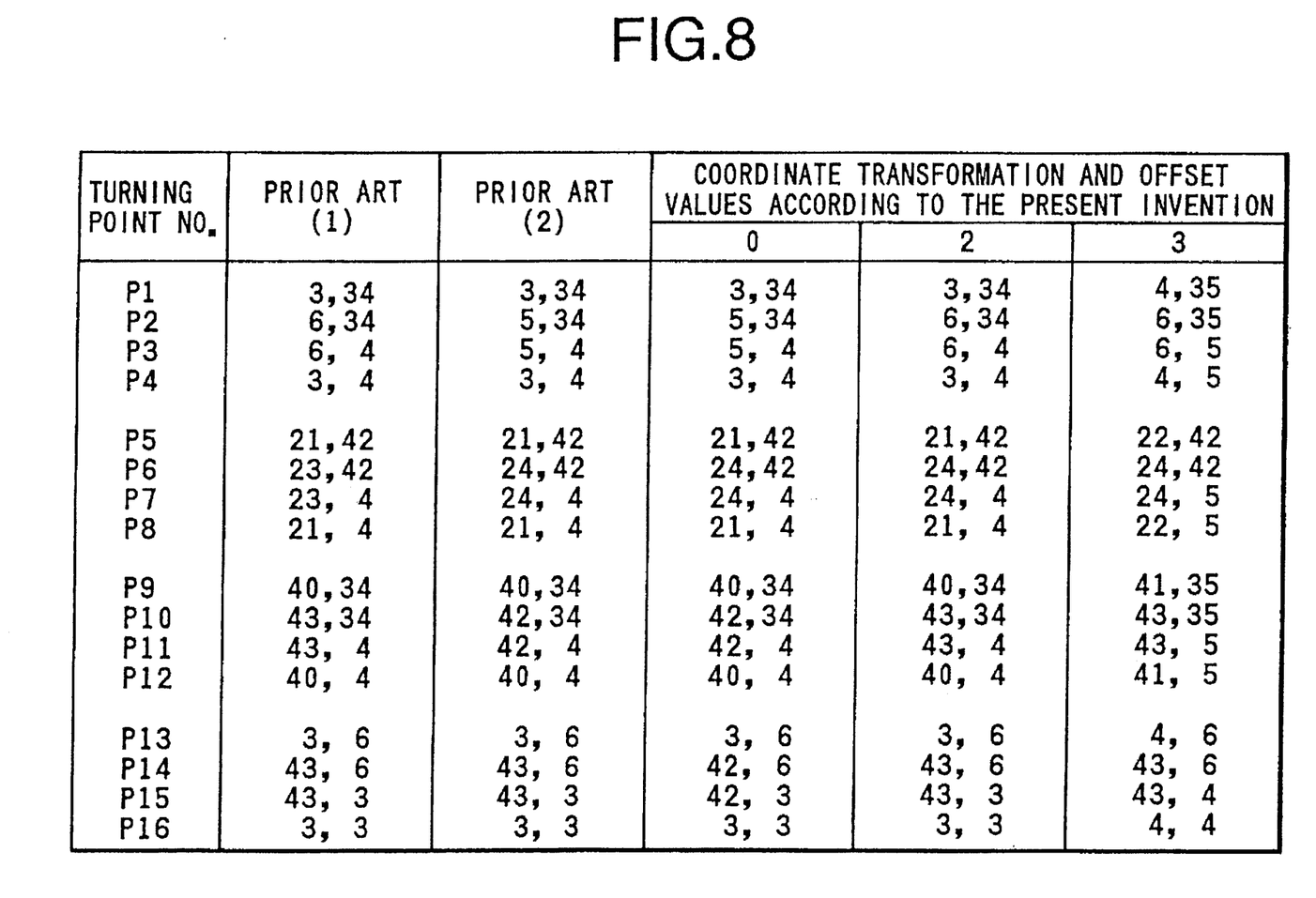
FIG. 8 is a view showing a line width of a character of 32×32–64×64 in size whereto a character of 256×256 with line width of 14 to 17 is converted by a method according to the present invention.

Referring to FIG. 8, there are shown coordinates of dot sequences of character outline data that are obtained by coordinate transformation of the outline data of FIGS. 6A and 6B into a 44×44-sized character by the prior arts (1) and (2) and by the method according to the present invention. Rounding of coordinate values except the Gauss' symbol is conducted by counting fractions of 5 and over as a unit and disregarding the rest. In the prior art (2), a long side of a character part, which includes a point of least number, is selected as a reference line segment.

As shown in FIG. 8, both the prior arts (1) and (2) may produce lines being different in width by reducing character size through coordinate transformation. According to the present invention, it is apparent that a uniform line can be generated through transformation by presetting a suitable offset value, i.e., line widths of 4 and 3 are obtained at offset values of 2 and 3 respectively.

Figure 9:
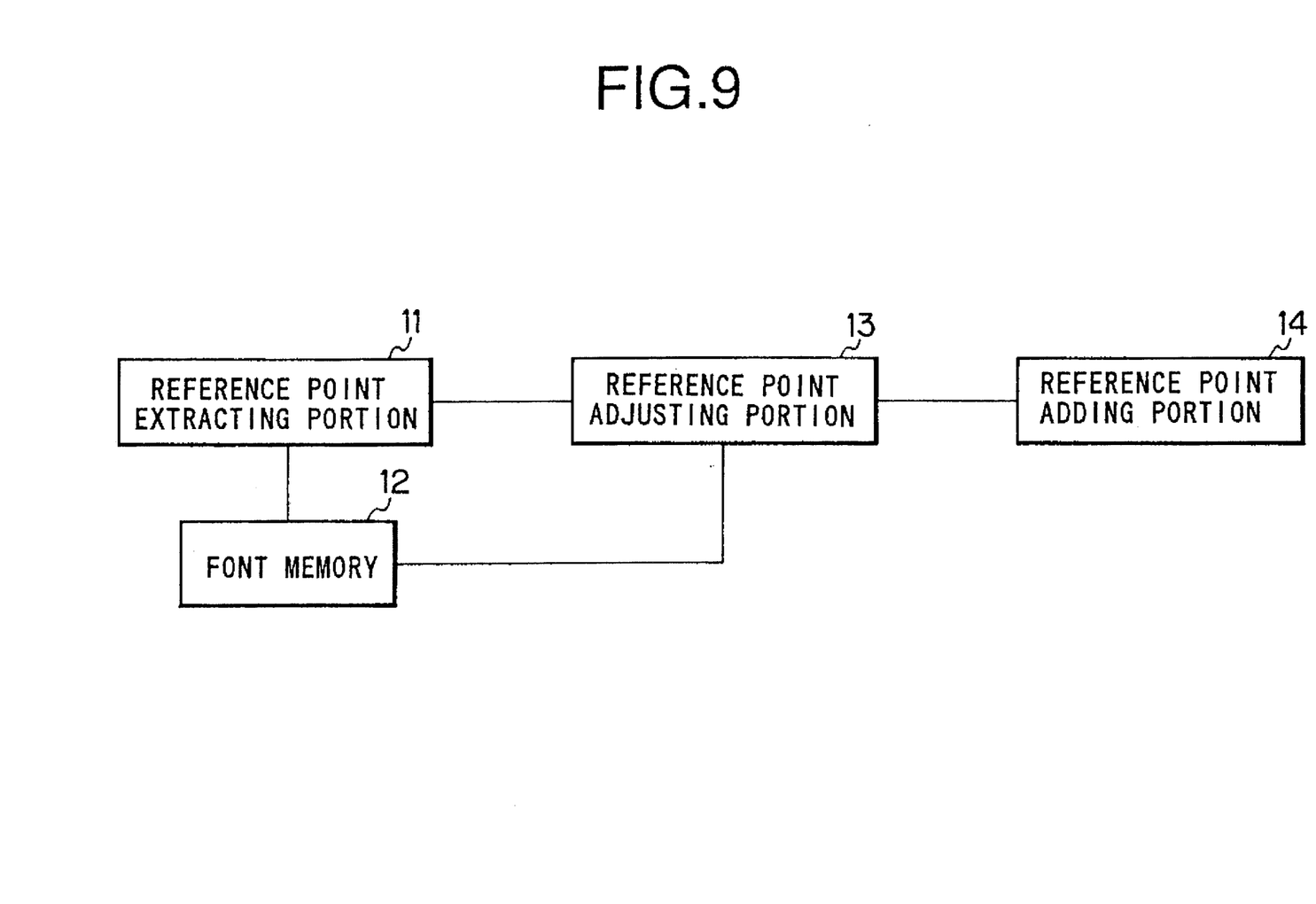
FIG. 9 is an electric circuit diagram for explaining an embodiment of a reference-point setting method according to the present invention.

FIG. 9 is an illustration of a reference-point setting method and device according to the present invention, which includes a reference point extracting portion 11, a font memory 12, a reference-point adjusting portion 13 and a reference-point adding portion 14.

The reference point extracting portion 11 determines coordinates of a reference point from data for a character part of the outline font. The font memory 12 stores therein the outline data before adding a reference point. The reference-point adjusting portion 13 adjusts coordinates of reference points determined for respective character parts on the basis of the character data so that the character parts may not stick-out or separate from each other. The reference-point adding portion 14 adds the reference points adjusted by the reference-point adjusting portion 13 to the character outline data.

Figure 10:
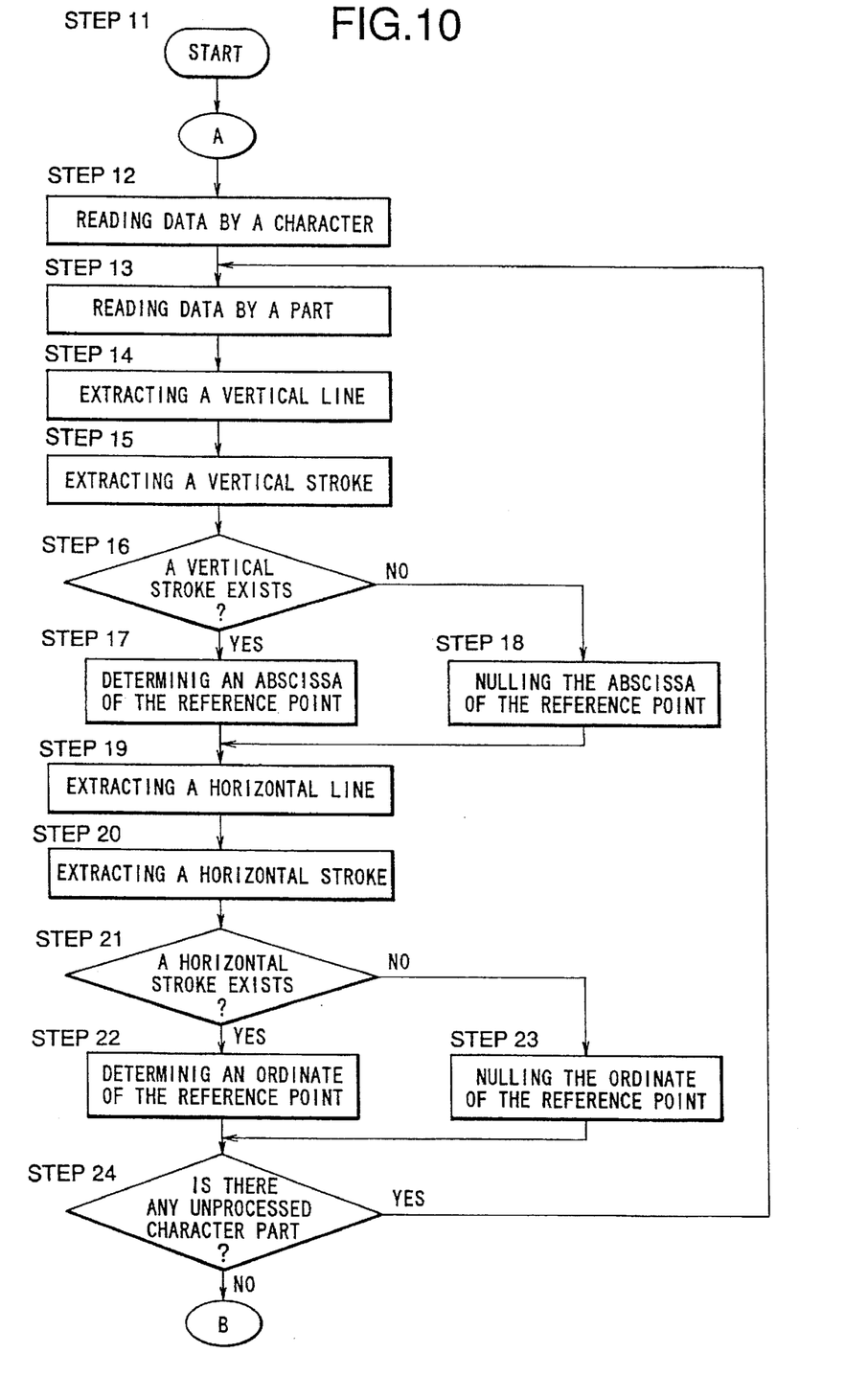
FIG. 10 is a part of a flow chart for explaining the reference-point setting method shown in FIG. 9.
Figure 11:
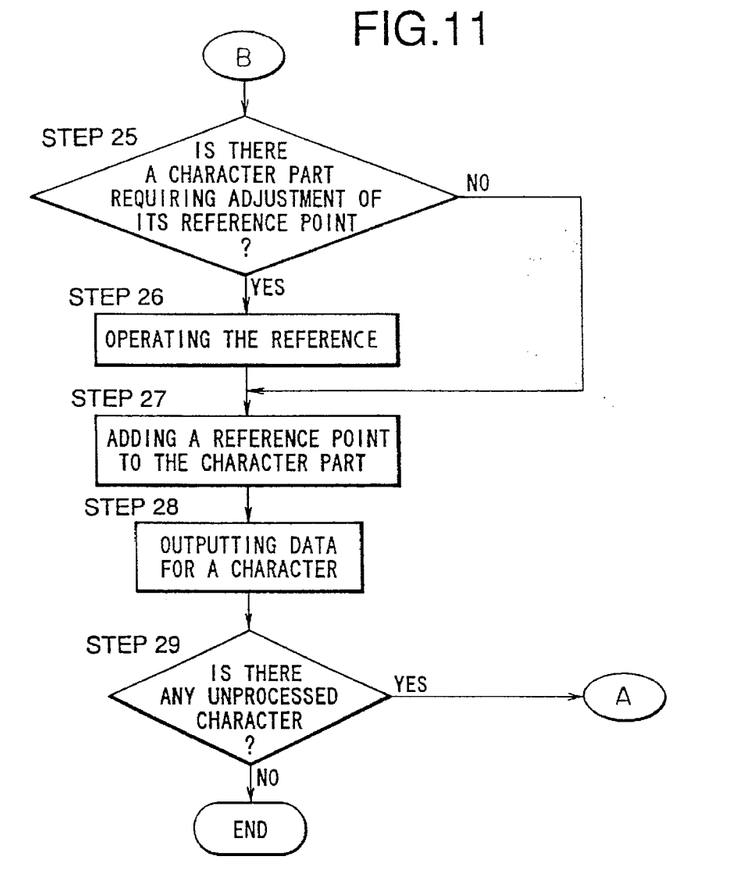
FIG. 11 is a remaining part of the flow chart for explaining the reference-point setting method shown in FIG. 10.

FIGS. 10 and 11 show a flow chart for explaining processing operations of reading-in outline font data defined by dot sequences constituting a character outline; searching character parts having vertical and horizontal strokes; determining coordinates of reference points not allowing the character parts to stick out and separate from each other; and setting the reference points.

Figure 12:
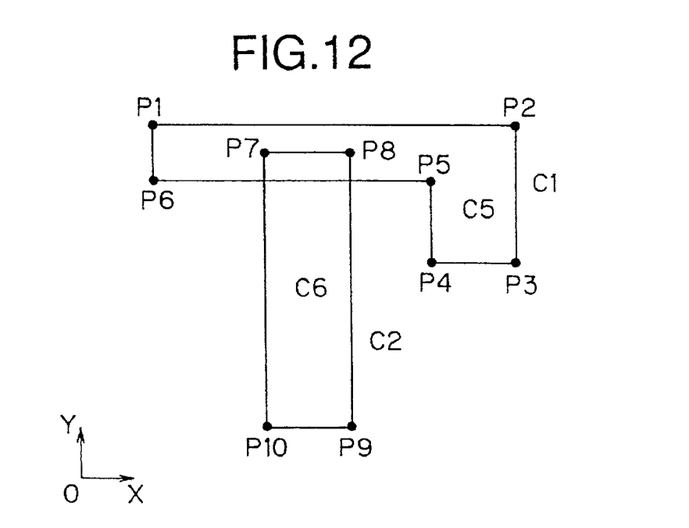
FIG. 12 is a view showing outline font data composed of two character parts.

FIG. 12 illustrates outline font data composed of two character-parts $C_5$ and $C_6$ which point-to-point line segments have clockwise vectors about the character parts.

The shown embodiment relates to processing for adding reference points to the outline font data shown in FIG. 12. Referring to FIGS. 10 and 11, the processing operation will be explained as follows:

Step 11: The processing starts.

Step 12: Data for one character are read out from the font memory 12.

Step 13: Data for one character part are selectively read out from the data obtained at step 12 and are transferred to the reference point extracting portion 11 which reads coordinates of 6 points $P_1$-$P_6$ of the character part $C_1$.

Step 14: The reference point extracting portion 11 examines vertical line segments and their direction in the data of the character part. The character part $C_5$ includes a downward line $P_2$-$P_3$ and upward lines $P_4$-$P_5$ and $P_6$-$P_1$.

Step 15: The downward line $P_2$-$P_3$ and the upward line $P_4$-$P_5$ composing vertical strokes of the character $C_5$ are extracted.

Step 16: Checking is made whether the vertical strokes are extracted or not at step 15.

Step 17: When the extraction of the vertical strokes is confirmed at step 15, the abscissa of the upward line $P_4$-$P_5$ is set as the value of the abscissa of a reference point of the character part $C_5$.

Step 18: If no vertical stroke is extracted at step 16, the abscissa value of the reference point of the character part $C_5$ is nulled.

Step 19: Horizontal line segments and their direction in the data of the character part are examined. The character part C5 includes a rightward line $P_1$-$P_2$ and leftward lines $P_3$-$P_4$ and $P_5$-$P_6$.

Step 20: The rightward line $P_1$-$P_2$ and the leftward line $P_5$-$P_6$ composing horizontal strokes of the character $C_5$ are extracted.

Step 21: Checking is made whether the horizontal strokes are extracted or not at step 20.

Step 22: When the extraction of the horizontal strokes is confirmed at step 22, the ordinate of the leftward line $P_5$-$P_6$ is set as the value of the ordinate of a reference point of the character part $C_5$.

Step 23: If no horizontal stroke is extracted at step 21, the ordinate value of the reference point of the character part $C_5$ is nulled.

Step 24: If there is any unprocessed character part in the character being currently processed, the operation returns to step 13. If all parts of the character were processed, the operation proceeds to step 25. In this case, the character part $C_6$ remains unprocessed, a reference point for second part of the character is searched at step 13 and thereafter. Since the character part $C_6$ includes only vertical strokes, the abscissa of its reference point is determined as the abscissa of the upward line $P_{10}$-$P_7$ and the ordinate is nulled.

Step 25: Among the currently processed character parts are searched combinations of those that require adjustment of coordinate values of their reference points. In the shown case, the character parts $C_5$ and $C_6$ are selected and the coordinates of the reference points of their vertical lines will be adjusted.

Step 26: The reference-point adjusting portion 13 adjusts the coordinates of the reference points of the character parts according to the outline data stored in the font memory 12 and the reference-point coordinates determined by the reference-point extracting portion 11. When the reference points of two character-parts to be adjusted in vertical direction have the ordinate Ys and the null ordinate respectively, the null ordinate is replaced by the ordinate Ys to make both reference points matched with each other. When the reference points of two character-parts to be adjusted in horizontal direction have the abscissa Xs and the null abscissa respectively, the null abscissa is replaced by the abscissa Xs to make both reference points matched with each other. For the character parts $C_5$ and $C_6$, the reference point of the part $C_5$ has the ordinate value and the reference point of the part $C_6$ has the null ordinate. Accordingly, the reference point of the part $C_6$ is given the same ordinate value that the reference point of the part $C_5$.

Step 27: The reference-point adding portion 14 adds the adjusted reference-points to the outline font data according to the resultant outputs of the reference-point adjusting portion 13.

Step 28: The character data with reference points added thereto are output.

Step 29: Checking is made whether unprocessed character data remain or not. If there is unprocessed character data, the processing returns to step 12.

Step 30: The processing is ended.

When the above-mentioned reference-point setting method is applied for character parts including line components corresponding to vertical and horizontal strokes, it is possible to determine the abscissa value of a reference point to control a line width of a vertical stroke and the ordinate value of a reference point to control a line width of a horizontal stroke, thereby the line width control both in vertical and horizontal directions can be achieved by using one reference point when the character is reduced in size by coordinate transformation. Furthermore, it is also possible to prevent the character parts from sticking out or separating from each other when the character is reduced in size through coordinate transformation by previously matching coordinate values of reference points of vertical and horizontal components of the character parts. This means that the size reduction of the character may be conducted maintaining their relative locations.

While the described embodiment relates to size-reduction by coordinate transformation of character outline font, it is to be easily understood that like embodiment can be applied when the character outline font is enlarged by coordination transformation.

As described above, according to one aspect of the present invention, it is possible to express coordinates of dot sequences before transformation as relative coordinates from an optional reference point, transform the coordinates of the reference point and coordinates of the dot sequences plus a predetermined offset value by using a reduction ratio, and generate character parts of a uniform line width from character parts having a specified range of line width irrespective of coordinates of the character before its coordinate transformation.

According to another aspect of the present invention, it is possible to generate a character part of uniform line width even from a character part having vertical and horizontal strokes through the coordinate transformation by reduction ratio.

According to another aspect of the present invention, it is possible to prevent it from occurring that the character-parts from sticking out or splitting away from each other when the coordinate transformation by reduction ratio.

According to yet another aspect the present invention, it is further possible to provide a device which generates a character part of uniform line width with no sticking-out or separating element irrespective of coordinates of an original character-part that has lines being different in width within a certain range and contains both vertical and horizontal strokes.

We claim:

1. A method for generating a line of uniform width, which, in altering a size of an outline font defined by a dot sequence composing a character outline, comprises the steps of:

representing transformable coordinates of the dot sequence as coordinates relative to an optional reference point for transforming coordinates for altering a character size; and transforming coordinates of the reference point, the relative coordinates of the dot sequence, and a predetermined offset value by the use of an alteration ratio, thereby generating a character part having a line of uniform width through coordinate transformation for altering the size of character part having lines of different width within a specified range irrespective of original coordinates of the character part, wherein said predetermining step determines said predetermined offset value in accordance with character sizes before and after transformation, a range of line widths of a character part before transformation, said uniform width of the character part after transformation and the reference point in accordance with the following equations:

$$Xi'=[n\times(Xi-Xs+a)/M+0.5]+[n\times Xs/M+0.5]$$

$$Yi'=[n\times(Yi-Ys+a)/M+0.5]+[n\times Ys/M+0.5]$$

where
Xi—original X coordinates
Xs—X coordinate of reference point
Xi'—transformed X coordinate
n—altered data size
M—original data size
Yi—original Y coordinate
Ys—Y coordinate of reference point
Yi'—transformed Y coordinate
and [ ] indicates truncation.

2. A method for generating a line of a uniform width, which, in altering a size of an outline font defined by a dot sequence composing a character outline, comprises the steps of:

representing transformable coordinates of the dot sequence as coordinates relative to an optional reference point for transforming coordinates for altering a character size; and transforming coordinates of the reference point, the relative coordinates of the dot sequence, and a predetermined offset value by the use of an alteration ratio, thereby generating a character part having a line of uniform width through coordinate transformation for altering the size of character part having lines of different width within a specified range irrespective of original coordinates of the character part, said transforming step including transforming an original X coordinate Xi and an original Y coordinate Yi into a transformed X coordinate Xi' and a transformed Y coordinate Yi' in accordance with the following equations:

$$Xi'=[n\times(Xi-Xs+a)/M+0.5]+[n\times Xs/M+0.5]$$

$$Yi'=[n\times(Yi-Ys+a)/M+0.5]+[n\times Ys/M+0.5]$$

where
Xs—X coordinate of reference point
n—altered data size
M—original data size
Ys—Y coordinate of reference point
and [ ] indicates truncation.

3. A method for generating a line of a uniform width, according to claim 2, further comprising:

checking for any dot sequence in a character part which has not been transformed by said transforming step; and repeating said representing and transforming steps until all dot sequences of the character part have been transformed.

4. A method for generating a line of a uniform width, according to claim 2, further comprising:

generating a character part font using transformed dot sequences for said character part; and plotting the character part font.

5. A device for generating a line of uniform width, comprising:

a data input portion for reading coordinates of a dot sequence and obtaining coordinate data;

an offset value reading portion for reading a predetermined offset value corresponding to an altered character size on the basis of the coordinate data read by the data input portion;

a reference point selecting portion for selecting a reference point for a character part from the coordinate data read by the data input portion;

a coordinate transforming portion for transforming coordinates of a dot sequence of the character part for altering the size of the character part in accordance with the coordinate data, the reference point and the predetermined offset value, wherein said predetermined offset value is determined in accordance with character sizes before and after transformation, a range of line widths of a character part before transformation, said uniform width of the character part after transformation and the reference point in accordance with the following equations:

$$Xi'=[n\times(Xi-Xs+a)/M+0.5]+[n\times Xs/M+0.5]$$

$$Yi'=[n\times(Yi-Ys+a)/M+0.5]+[n\times Ys/M+0.5]$$

where
Xi—original X coordinates
Xs—X coordinate of reference point
Xi'—transformed X coordinate
n—altered data size
M—original data size
Yi—original Y coordinate
Ys—Y coordinate of reference point
Yi'—transformed Y coordinate
and [ ] indicates truncation; and a plotting portion for generating a character part font by using a dot sequence transformed by the coordinate transforming portion and by plotting by superimposing the character part font on another character part.

6. A device for generating a line of uniform width, according to claim 5, wherein said reference point selecting portion determines coordinates of a reference point of a character part according to coordinates of a reference point of another character part to control relative positions of character parts through coordinate transformation for size alteration.

7. A device for generating a line of a uniform width comprising:

a data input portion for reading coordinates of a dot sequence and obtaining coordinate data;

an offset value reading portion for reading a predetermined offset value corresponding to an altered character size on the basis of the coordinate data read by the data input portion;

a reference point selecting portion for selecting a reference point for a character part from the coordinate data read by the data input portion;

a coordinate transforming portion for transforming coordinates of a dot sequence of the character part for altering the size of the character part in accordance with the coordinate data, the reference point and the predetermined offset value, wherein said coordinate transforming portion transforms coordinates in accordance with the following equations:

$$Xi'=[n\times(Xi-Xs+a)/M+0.5]+[n\times Xs/M+0.5]$$

$$Yi'=[n\times(Yi-Ys+a)/M+0.5]+[n\times Ys/M+0.5]$$

where
Xi—original X coordinates
Xs—X coordinate of reference point
Xi'—transformed X coordinate
n—altered data size
M—original data size
Yi—original Y coordinate
Ys—Y coordinate of reference point
Yi'—transformed Y coordinate
and [ ] indicates truncation.

8. A device for generating a line of uniform width, according to claim 7, wherein said reference point selecting portion determines coordinates of a reference point of a character part according to coordinates of a reference point of another character part to control relative positions of character parts through coordinate transformation for size alteration.

9. A method for generating a line of a uniform width, according to claim 1, further comprising:

checking for any dot sequence in a character part which has not been transformed by said transforming step; and repeating said representing and transforming steps until all dot sequences of the character part have been transformed.

10. A method for generating a line of a uniform width, according to claim 1, further comprising:

generating a character part font using transformed dot sequences for said character part; and plotting the character part font.

\* \* \* \* \*